(12) United States Patent
Schnaubelt

(10) Patent No.: US 8,643,343 B2
(45) Date of Patent: Feb. 4, 2014

(54) ELECTRONIC CIRCUIT WITH CAPACITOR

(75) Inventor: Matthias Schnaubelt, Lindau (CH)

(73) Assignee: Legic Identsystems AG (CH)

( * ) Notice: Subject to any disclaimer, the term of this patent is extended or adjusted under 35 U.S.C. 154(b) by 831 days.

(21) Appl. No.: 12/821,506

(22) Filed: Jun. 23, 2010

(65) Prior Publication Data

US 2010/0328040 A1   Dec. 30, 2010

(30) Foreign Application Priority Data

Jun. 30, 2009  (EP) ..................................... 09008516

(51) Int. Cl.
*H02J 7/00*   (2006.01)
*H02J 7/04*   (2006.01)

(52) U.S. Cl.
USPC ........... 320/166; 320/167; 320/132; 320/134; 320/152

(58) Field of Classification Search
CPC ....................................................... H02J 7/345
USPC .................................................. 320/166, 167
See application file for complete search history.

(56) References Cited

U.S. PATENT DOCUMENTS

| | | | |
|---|---|---|---|
| 4,481,675 A | * | 11/1984 | Ichikawa et al. ........... 455/343.2 |
| 2005/0179520 A1 | | 8/2005 | Ziebertz |
| 2006/0261751 A1 | | 11/2006 | Okabe |

FOREIGN PATENT DOCUMENTS

| | | | | |
|---|---|---|---|---|
| GB | 2 363 213 | | 12/2001 | |
| JP | 2000-037036 | | 2/2000 | |
| JP | 2000037036 | | 2/2000 | |
| JP | 2000037036 A | * | 2/2000 | ................ H02J 1/00 |
| WO | WO 2008/035523 A1 | | 3/2008 | |

* cited by examiner

*Primary Examiner* — M'Baye Diao
*Assistant Examiner* — Ahmed Omar
(74) *Attorney, Agent, or Firm* — Ostrolenk Faber LLP

(57) ABSTRACT

An electronic circuit comprising a circuit module, a capacitor connected to the circuit module and a shutdown line providing a shutdown signal to the circuit module for suspending the circuit module. The electronic circuit further comprises a switching module for switching the capacitor such as to reduce discharging of the capacitor, depending on the shutdown signal. Particularly, the switching module disconnects the capacitor from ground. Disconnection takes effect when the circuit module is suspended or in power down mode because of the shutdown signal being provided.

9 Claims, 3 Drawing Sheets

ELECTRONIC CIRCUIT WITH CAPACITOR

CROSS REFERENCE TO RELATED APPLICATION

The present application claims benefit of and priority to European Patent Application No. 09008516.8, filed Jun. 30, 2009, the entire contents of which are hereby incorporated by reference herein.

BACKGROUND

1. Field of the Disclosure

The present invention relates to an electronic circuit comprising a capacitor. In particular the present invention relates to an electronic circuit configured as an (electronic) transceiver of a read/write device for non-contact communication via an electro-magnetic field with at least one data carrier (medium).

2. Related Art

In a communication system, non-contact or wireless communication between a read/write device (reader) and a data carrier (medium) is effected by an electro-magnetic field transceived (modulated, emitted) by the reader, in particular by an electronic transceiver comprising a circuit module, e.g. a communication module or a control module. The electronic transceiver is used for the signal coding, in particular for encoding and decoding of the communication signals or the signals used to provide or carry out the communication. The electronic transceiver comprises at least one capacitor connected to the circuit module. When no communication takes place, the capacitor discharges through the electronic transceiver, or parts of the electronic transceiver such as the circuit module. This is for example the case when the reader, or at least the circuit module, is put into a stop mode or power down mode. Afterwards, the power stabilizing capacitor has to be charged or re-charged before the communication may be resumed, as the capacitor is configured to supply power to the circuit module.

Discharging of a power stabilizing capacitor connected to an electronic circuit is particularly disadvantageous when the energy loss due to charging and discharging of the capacitor is in the same range as the energy (or power) needed to operate the electronic circuit. This is basically not acceptable for a battery operated or battery powered device such as a reader.

The following two patent applications are directed towards different arrangements or circuits for discharge control or discharge prevention.

WO 2008/035523 A1 discloses how to use a MOS-FET, in particular a four-terminal back gate switching MOS-FET, for charge control, but also for discharge control. A back-gate voltage generator circuit, used for generating a back-gate voltage, includes first and second n-type MOS-FETs connected in series through a common source electrode. A voltage at the common source electrode serves as the back-gate voltage of the four-terminal back gate switching MOS-FET, and the back-gate voltage is used as a reference voltage for generating signals for controlling the first and second n-type MOS-FETs.

US 2006/0261751 A1 discloses a discharge prevention circuit and electronic equipment with the discharge prevention circuit. The discharging prevention circuit includes a first power line, a second power line, a capacitor, a current detector, and a switch. The first and second power lines directly or indirectly connect a power feed line to a load. The capacitor and the current detector are directly or indirectly connected in series between the first and second power lines. The switch is disposed in the first or second power line. The current detector detects a charging current to the capacitor and a discharging current from the capacitor. If the current detector detects discharging current from the capacitor, the switch acts to stop current flow between the capacitor and the power feed line.

JP 2000 037036 discloses a power-saving driving circuit which comprises a switching means arranged in a path from a power stabilizing circuit to a distance measuring IC (DMIC). The power-saving driving circuit further comprises a power stabilizing capacitor which has one of its conductors connected to the path between the power stabilizing circuit and the DMIC, and the other conductor connected to ground. When the power stabilizing circuit is turned off, the switching means interrupt the path between the power stabilizing circuit and the DMIC and thereby cut off the power stabilizing capacitor and the power stabilizing circuit from the DMIC. In addition, the power-saving driving circuit comprises a diode which is arranged between the power stabilizing capacitor and the power stabilizing circuit such that the power stabilizing capacitor is also cut off from the power stabilizing circuit when the power stabilizing circuit is turned off. According to JP 2000 037036, the switching means and the diode make it possible to reduce wasteful discharging of the power stabilizing capacitor through the power stabilizing circuit and the DMIC. However, the arrangement of the switching means according to JP 2000 037036 is not suitable in cases where the path between the power stabilizing circuit and the DMIC is not accessible, e.g. if the power stabilizing circuit and the DMIC are part of the same integrated circuit, or in cases where it is not desirable to separate the power stabilizing circuit from the DMIC, e.g. if there are different modes of operation with different levels of power requirements.

SUMMARY

It is an object of the present invention to overcome at least some of the limitations of the prior art. In particular, it is an object of the present invention to provide an electronic circuit with a capacitor, e.g. a power stabilizing capacitor, where a discharging of the capacitor is reduced when said electronic circuit, or a part thereof, is not used, whereas it is not necessary to cut off a power stabilizing circuit. It is a further object of the present invention to provide—as the electronic circuit—an electronic transceiver of a read/write device for wireless communication with at least one medium via an electro-magnetic field, wherein discharging of a capacitor, e.g. a power stabilizing capacitor, of the electronic transceiver is reduced when the electronic transceiver is not used for communication.

According to the present invention, these objects are achieved through the features of the independent claims. Further features or advantageous embodiments follow from the dependent claims and/or the description.

Particularly, the objects of the invention are achieved by an electronic circuit comprising a circuit module, a capacitor, e.g. a power stabilizing capacitor, connected to the circuit module and a shutdown line providing or delivering a shutdown signal to the circuit module. The shutdown signal is used to suspend (power down, shut down, disable), at least temporarily, the circuit module or a part (parts) thereof. While suspended or in power down mode, the circuit module is out of function and, for example, can not perform or can not be used for a communication with a medium, preferably a non-contact or contactless communication. The electronic circuit further comprises a switching module which, depending on the shutdown signal, disconnects the capacitor from ground such as to reduce discharging of the capacitor in a suspended state of the circuit module. To be more precise, the switching module is connected to one of the capacitor's conductors, while the other conductor of the capacitor is connected to the circuit module. Thus, the switching module is arranged between the capacitor and ground, or other electronic components or circuits connecting the capacitor to ground. The switching module is configured to disconnect the capacitor from ground, or from said other electronic components or circuits connected to ground, in case the shutdown signal is provided to the circuit module or the circuit module is suspended (in power down mode), respectively. By disconnecting the capacitor from ground, it is possible to reduce significantly the discharging of the capacitor, without having to access and/or interrupt the connection between the capacitor and the circuit module.

Preferably, the circuit module comprises a voltage regulator, the (power stabilizing) capacitor has one of its conductors connected to an output of the voltage regulator, and the capacitor has the other one of its conductors connected to the switching module. For example, the circuit module is an integrated circuit having a voltage regulator integrated. By connecting one of the capacitor's conductors to the output of the voltage regulator and its other one to the switching module, the capacitor can be disconnected from ground by the switching module and the discharging of the capacitor can be reduced significantly, without having to access and/or interrupt the connection between the capacitor and the output of the voltage regulator. Preferably, the electronic circuit comprises a diode-free connection between the capacitor and the voltage regulator.

In an embodiment, the circuit module is an integrated circuit, and the switching module is integrated in the integrated circuit.

In a further embodiment, the circuit module is an integrated circuit having an integrated voltage regulator, and the switching module is integrated in the integrated circuit. For example, the integrated circuit has a voltage output terminal (pin) providing an output voltage of the voltage regulator, the integrated circuit has a switch terminal (pin) connected to the switching module, the capacitor has one of its conductors connected to the voltage output terminal, and the capacitor has the other one of its conductors connected to the switch terminal.

In a preferred embodiment, the electronic circuit is configured and realized as an electronic transceiver of a read/write device. The electronic transceiver is used for wireless communication with at least one medium via electro-magnetic field. The circuit module is configured to carry out or to perform said communication in the absence of the shutdown signal—in other words, in a non-suspended state (non-suspended phase) when no shutdown signal is provided.

In a next embodiment, the electronic circuit comprises a switching line. The switching line is used to provide the shutdown signal to the switching module. Alternatively, an inverted shutdown signal or a driving signal, which depends on or is derived from the shutdown signal, is provided to the switching module. In such a case, the shutdown line and/or the switching line comprise a functional unit, for example an inverter, used to generate the respective signal.

The shutdown signal is provided by, or received from, a microcontroller of the reader, or the microcontroller generates, operates and/or is configured to operate the shutdown signal, respectively. The shutdown signal is delivered to the circuit module and to the switching module. Alternatively or additionally, the driving signal may be provided by, or received from, the microcontroller directly, or the microcontroller is configured to operate the driving signal, respectively. In this case, the shutdown signal and the driving signal are aligned to each other within or by the microcontroller. The microcontroller may be a part of the reader (inside the reader) or only interconnected to the reader.

In a further embodiment, the switching module of the electronic circuit or the electronic transceiver comprises a first and a second switching element interconnected in series, as well as a first resistor connected in parallel to the first switching element. The first resistor is connected on one hand between the first and the second switching element and on the other hand between the first switching element and the capacitor. For example, MOS-FETs (Metal-Oxide-Semiconductor Field-Effect Transistor) may be used as the first and the second switching element. The first switching element is connected to the capacitor, to ground and to the second switching element. The second switching element is further connected to the switching line and also to ground.

The frequency of the electro-magnetic field provided by the reader, in particular the frequency of the carrier provided by the circuit module, is between 100 kHz and 135 kHz, or a frequency of the industrial, scientific or medical band (ISM frequency), preferably 13.56 MHz.

The invention is further directed towards a method of reducing discharging of a capacitor connected to a circuit module. The method comprises providing a shutdown signal to the circuit module and driving a switching module depending on the shutdown signal. On one hand, the shutdown signal is used to suspend the circuit module, at least temporarily. On the other hand, the shutdown signal is used to drive the switching module to disconnect the capacitor from ground such as to reduce discharging of the capacitor. In other words, to reduce discharging the method comprises the step of switching the capacitor by means of the switching module and dependent on the shutdown signal. In an embodiment, the switching module is used to disconnect the capacitor from ground, at least temporarily, in a suspended state of the circuit module.

BRIEF DESCRIPTION OF THE DRAWINGS

Aspects of the present invention will be described in more detail, by way of example, with reference to the following drawings. The description and the drawings should not be considered to limit the invention as claimed.

DETAILED DESCRIPTION OF THE EMBODIMENTS

Figure 1A:
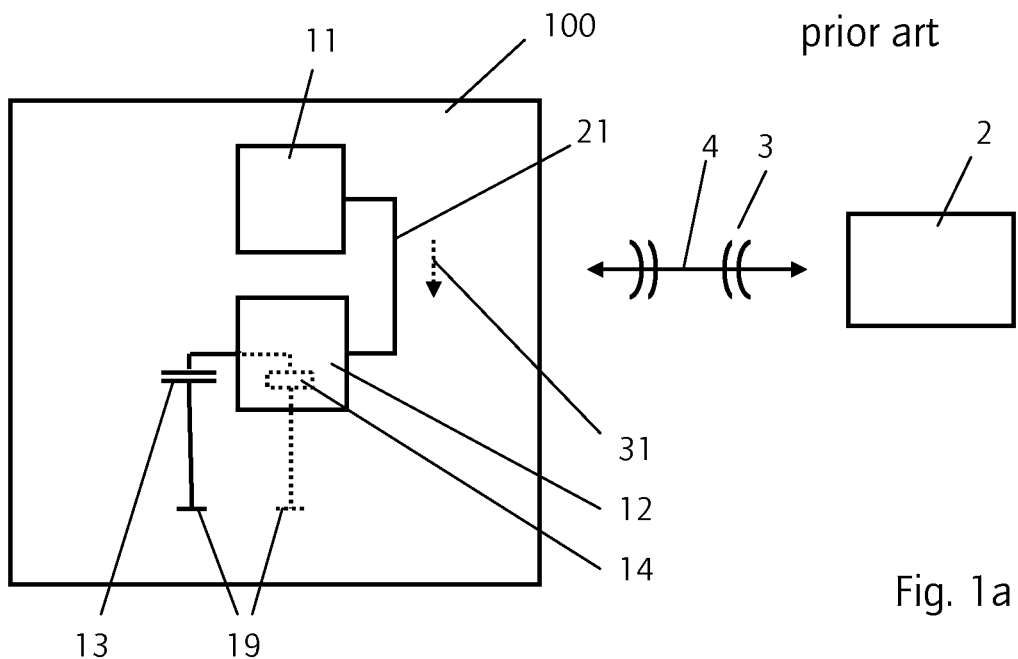
FIG. 1a shows a card reader according to the state of the art which comprises a circuit module and a capacitor, particularly a power stabilizing capacitor, connected to the circuit module.
Figure 1B:
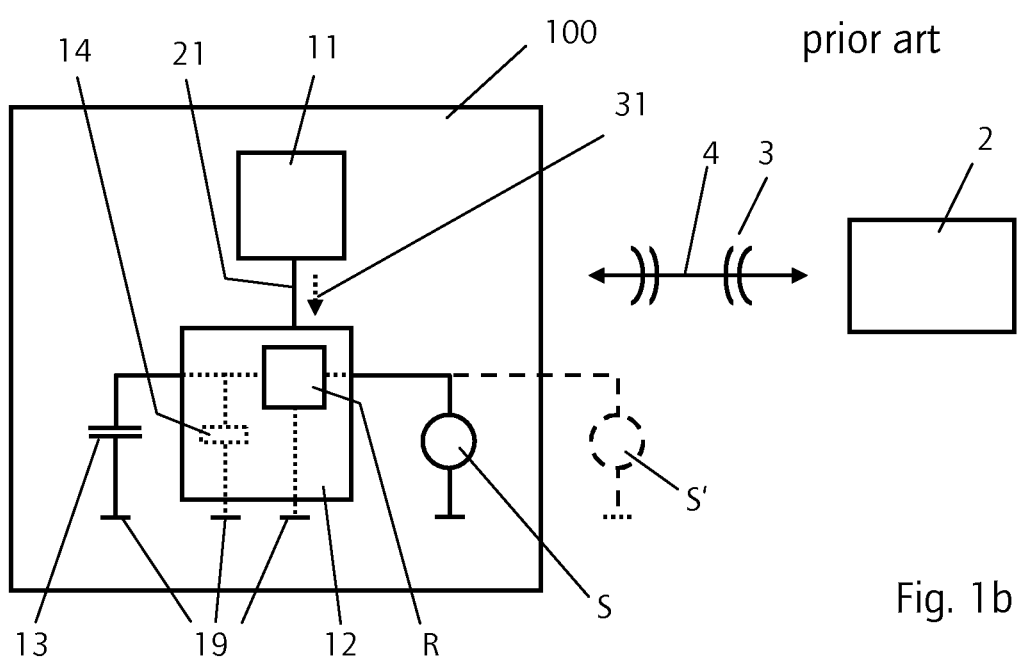
FIG. 1b shows a card reader according to the state of the art which comprises a circuit module with a voltage regulator and a capacitor, particularly a power stabilizing capacitor, connected to the circuit module.

FIGS. 1*a* and 1*b* show read/write devices according to the state of the art for non-contact (or contactless) data exchange with a card, in particular for reading of and/or writing on cards, hereinafter prior art reader 100. The prior art reader 100 comprises a microcontroller 11 and a circuit module (e.g. a communication and/or control module) 12 interconnected via a shutdown line 21. The prior art reader 100 further comprises a capacitor 13, particularly a power stabilizing capacitor 13, connected to the circuit module 12 and to ground 19. At least the circuit module 12 and the capacitor 13 are part of an electronic transceiver of the prior art reader 100. The electronic transceiver is used for wireless communication 4 with a data carrier or medium 2, such as a tag or an IC card. The wireless communication 4 takes place by way of an electromagnetic field 3 which is transmitted or transceived by the prior art reader 100 or its electronic transceiver, respectively. The microcontroller 11 is used to perform (enable, supervise) the communication 4.

The shutdown line 21 between the prior art reader 100 and the circuit module 12, for example a bus connection, is used to provide a shutdown signal 31, preferably a digital signal, from the microcontroller 11 to the circuit module 12. The shutdown signal 31 is used to reduce or to minimize the power consumption of the prior art reader 100 by, at least temporarily, disabling (disconnecting, powering down) the circuit module 12, or an active part of the circuit module 12. Disabling the circuit module 12 is effected by setting the circuit module 12 into a suspended state or suspended mode (stop mode, power down mode). In this mode, the circuit module 12 is provided only with a minimal power or needs no power, and therefore also no power supply, at all: The power consumption is minimized. In the power down mode, the circuit module 12 can essentially be viewed as a resistor arrangement (which may be also a single resistor only) or simply as a load 14 connected to ground 19. Accordingly, while disabled or suspended in the power down mode, the circuit module 12 does not drive or transmit the electro-magnetic field 3 for wireless communication 4 with the medium 2. In the power down mode, the capacitor 13 interconnected to the circuit module 12 discharges through the resistor arrangement i.e. the load 14 of the circuit module 12 which is generally connected to ground 19.

Figure 2A:
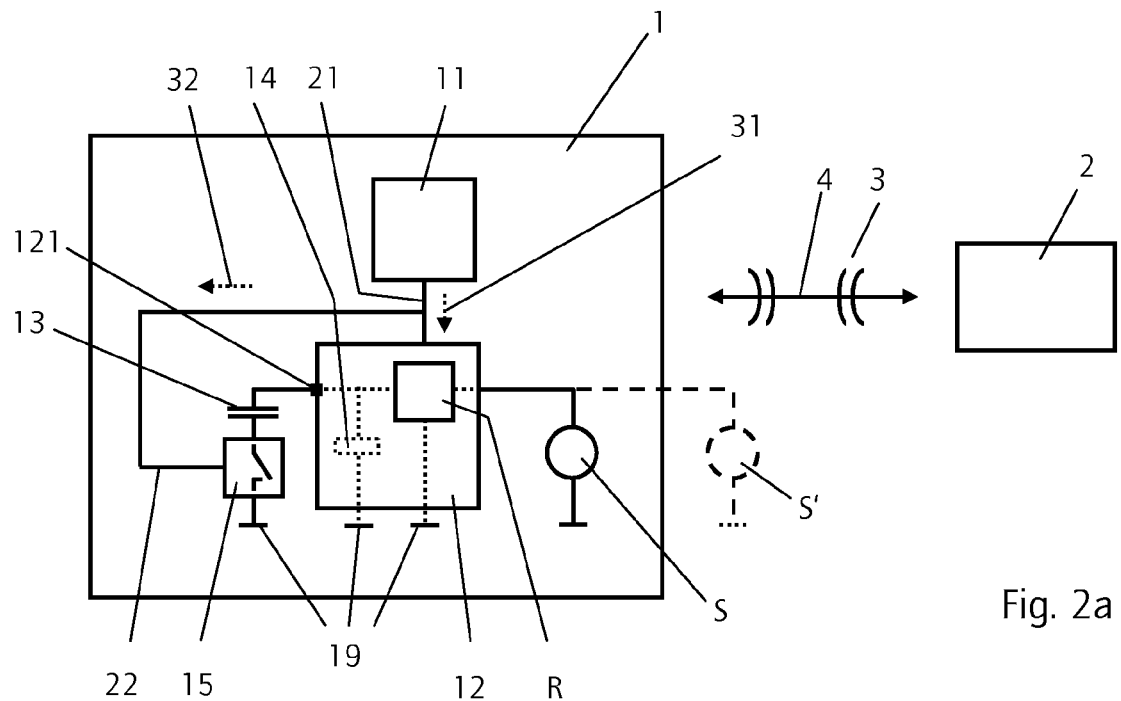
FIG. 2a shows a reader according to the invention comprising a circuit module, a capacitor, particularly a power stabilizing capacitor, connected to the circuit module and a switching module to switch the capacitor.
Figure 2B:
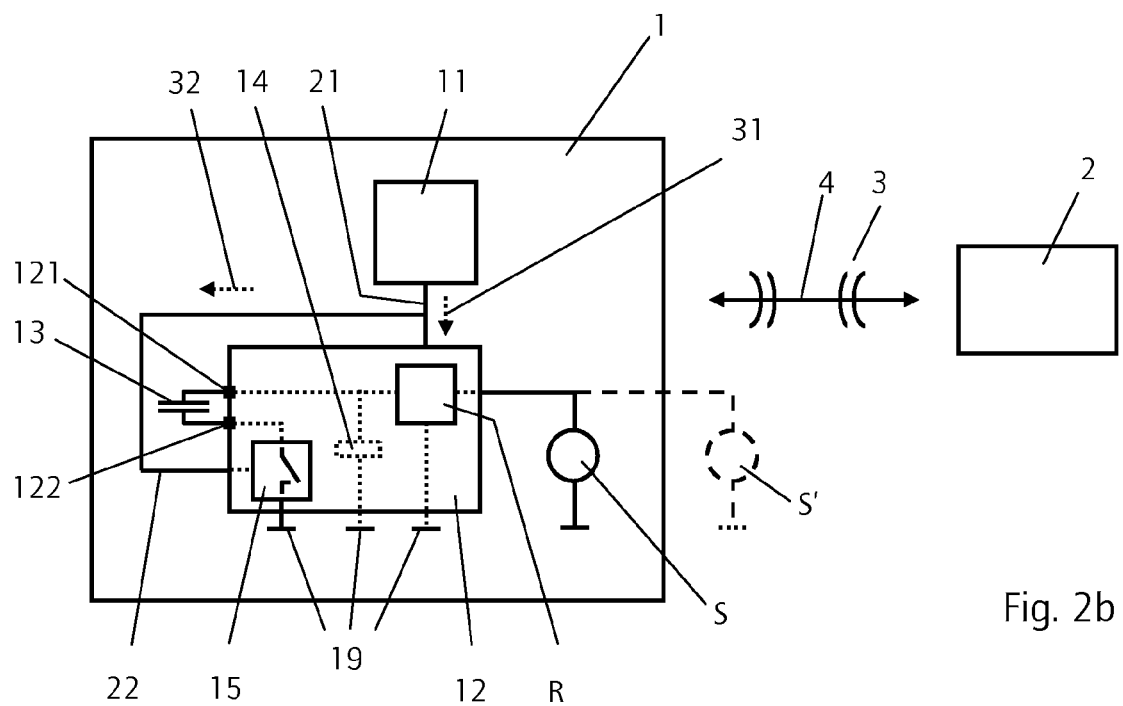
FIG. 2b shows a reader according to the invention comprising a circuit module, a capacitor, particularly a power stabilizing capacitor, connected to the circuit module and a switching module integrated in the circuit module for switching the capacitor.

FIGS. 2*a* and 2*b* show embodiments of a read/write device according to the invention, hereinafter reader 1.

As is illustrated in detail in FIGS. 1*b*, 2*a* and 2*b*, the circuit module 12 comprises a voltage regulator R which is configured to regulate the voltage, supplied to the voltage regulator R via an input terminal of the circuit module 12, by an internal power supply S of the reader 1 or an optional power supply S' arranged externally to the reader. The regulated output voltage is provided by the voltage regulator R to the load 14 of the circuit module 12 and via a voltage output terminal 121 to the capacitor 13, particularly a power stabilizing capacitor 13. There is a direct and bi-directional, e.g. diode-free, electrical connection between the capacitor 13 and the voltage output terminal 121 and thus the output of the voltage regulator R. There is also a direct and bi-directional, e.g. diode-free, electrical connection between the output of the voltage regulator R and the load 14. In an embodiment, for providing power to the microcontroller 11, the output of the voltage regulator R is also connected to the microcontroller 11.

Compared to the prior art, the reader 1 illustrated in FIGS. 2*a* and 2*b* additionally comprises a switching module 15 interconnected between the capacitor 13 and ground 19. Thus, the switching module 15 either connects the capacitor 13 to ground 19 or disconnects the capacitor 13 from ground 19. Furthermore, the switching module 15 is connected to the shutdown line 21 by a switching line 22. The switching line 22 is used to provide a driving signal 32 to the switching module 15. The shutdown signal 31, an inverted shutdown signal or a signal derived from the shutdown signal 31 is used as the driving signal 32. Alternatively, a different signal could be provided by the microcontroller 11 to the switching module 15 via a signal line, or the switching line 22 respectively, which is not in contact with (independent from) the shutdown line 21. The different signal may be used as the driving signal 32, as long as said different signal is logically tied to and, thus, dependent on the shutdown signal 31.

In an embodiment (not illustrated), the switching module 15 comprises its own voltage regulator which is connected to an internal power supply S or an optional power supply S' arranged externally to the reader 1. In an embodiment, the switching module 15 is an integrated circuit (IC).

In the embodiment of FIG. 2*b*, the switching module 15 is part of the circuit module 12; specifically, the switching module 15 is part of the integrated circuit implementing the circuit module 12. Accordingly, the capacitor 13 is connected with both of its conductors to the circuit module 12, specifically to two terminals or pins of the circuit module 12. One of the capacitor's conductors is connected to the voltage output terminal (pin) 121 of the circuit module 1 that provides the regulated output voltage from the voltage regulator R. The other one of the capacitor's conductors is connected to the switch terminal (pin) 122 which is connected to the switching module 15 which either connects or disconnects the capacitor 13 to or from ground 19.

The switching module 15 is configured and used such as to prevent that the capacitor 13 discharges via or through the load 14 of the circuit module 12 to, basically, ground 19—and to minimize discharging of the capacitor 13 via the circuit module 12. Therefore, the invention is most suitable for a battery powered reader, in particular to reduce consumption of battery power. Effects of self-discharging of the capacitor 13 are hereby not taken into account.

Figure 3:
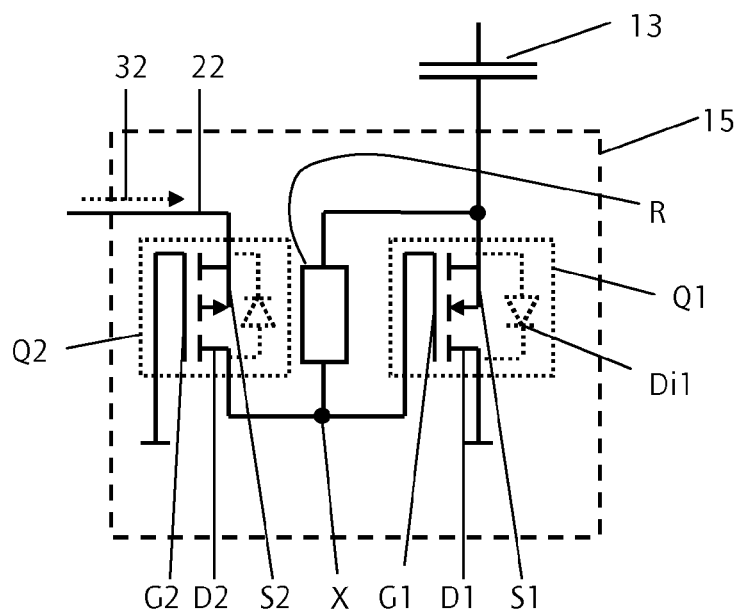
FIG. 3 shows details of the switching module used for switching the capacitor.

FIG. 3 shows details of the switching module 15. In this example, the switching module 15 comprises a first switching element Q1 and a second switching element Q2, preferably semiconductor switches. The first switching element Q1 is connected to the capacitor 13, particularly a power stabilizing capacitor 13, and is driven by the second switching element Q2. The second switching element Q2 is driven by the driving signal 32, provided via the switching line 22 and based on the shutdown signal 31. Arranged in parallel to the first switching element Q1 is a first resistor R1, which on one hand is connected in between the first and the second switching element Q1, Q2 and on the other hand is connected to the capacitor 13.

Figure 4A:
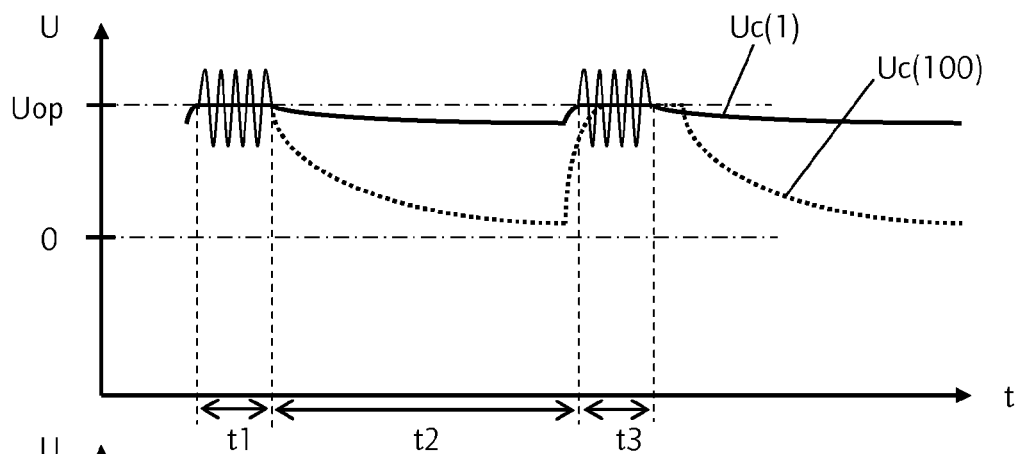
FIG. 4a shows a time diagram of a voltage U over the capacitor of the reader according to the invention compared to the prior art reader.
Figure 4B:
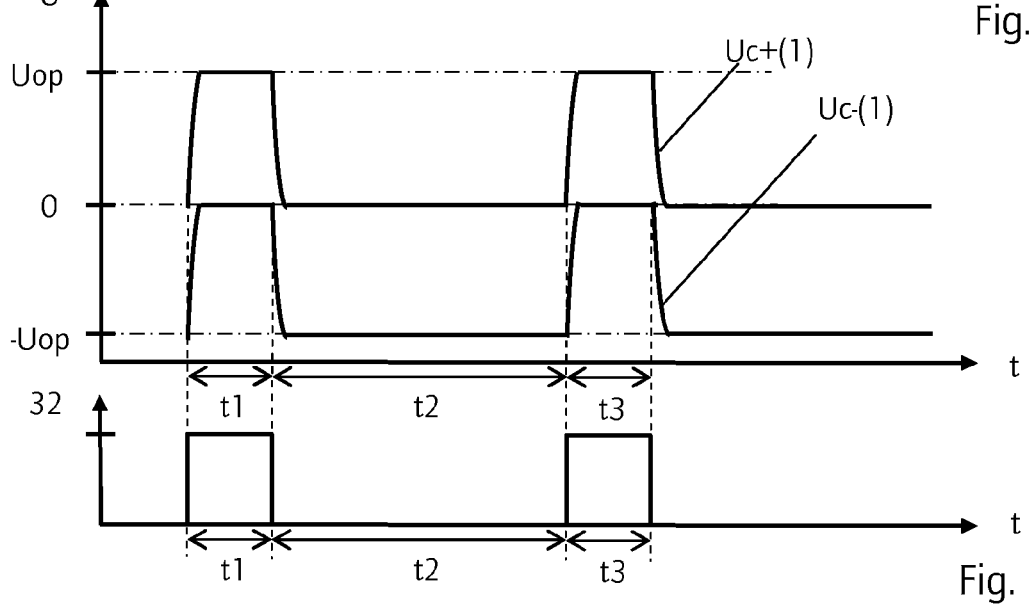
FIG. 4*b* shows a time diagram of a voltage U over the conductors of the capacitor of the reader.

In a first state (active state), corresponding to a first and third time period t1, t3 as shown in FIGS. 4*a*, 4*b*, no shutdown signal 31 is provided to the circuit module 12. Therefore, the circuit module 12 is in normal operating mode and, for example, communicates with the medium 4. The switching module 15 is provided with the driving signal 32 via the switching line 22. Basically, the inverted shutdown signal is used as the driving signal 32. Accordingly, the switching module 15 is powered and in conducting state (operating mode). The second switching element Q2 drives the first switching element Q1 in a way that the first switching element Q1 connects the capacitor 13 to ground 19. Over the capacitor 13 a positive voltage Uop, which for example is used for communication 4 with the medium 2, is present and provided to the circuit module 12.

In a second state (passive state), which corresponds to a second time period t2 as shown in FIGS. 4a, 4b, no driving signal 32, and therefore also no current, is provided to the switching module 15 and to the second switching element Q2 via the switching line 22. On the other hand, the shutdown signal 31 is provided from the microcontroller 11 to the circuit module 12, to power down or to suspend the circuit module 12. To do so, the switching element Q2 drives (interacts with) the first switching element Q1 in a way that the first switching element Q1 blocks the discharging of the capacitor 13 via the circuit module 12. In particular, the capacitor 13 does not discharge to ground 19 via the resistor arrangement i.e. the load 14 of the circuit module 12 while the shutdown signal 31 is provided. This basically takes place because the first switching element Q1 is in a blocking state. More precisely, the first switching element Q1 blocks the flow of current through capacitor 13 in a uni-directional way and thereby omits, that the capacitor 13 discharges via the first switching element Q1 to ground. In an embodiment, the second switching element Q2 may be driven by the driving signal 32 which is logically related to the shutdown signal 31 and provided directly from the microcontroller 11 via the switching line 22, which is not connected to the shutdown line 21.

To summarize, the second switching element Q2 acts—in a normal operating mode—as a current source, while the first switching element Q1 is used (operated) in a reverse operating mode (reverse mode). The arrangement or set-up of the switching element 15 is such that the juncture X between the first and the second switching element Q1, Q2 and the first resistor R1 is highly resistive. For the second state (passive state), in which the circuit module 12 is suspended (in power down mode), this has the results that no current is provided (or flows) neither to the second switching element Q2 nor to the first switching element Q1. For the time period, the circuit module 12 is suspended or powered down the second state (passive state); the microcontroller 11 can be put into idle state.

In the second state (passive state) as shown above, no driving signal 32 is provided to the switching module 15, when the shutdown signal 31 is provided by the microcontroller 11 to the circuit module 12. Alternatively, the driving signal 32, or directly the shutdown signal 31, is provided to the switching module 15, and to the second switching element Q2, when the shutdown signal 31 is provided to the circuit module 12 (second or passive state). The switching element Q2 actively drives the switching element Q1 in a way that the switching element Q1 blocks the normal operation of the capacitor 13. In particular, discharging of the capacitor 13 is not possible (blocked) as long as the driving signal 32 or the shutdown signal 31, respectively, is present. In any case, in the second state (passive state), the first switching element Q1 is in a non-conductive or blocking state.

If MOS-FETs (Metal-Oxide-Semiconductor Field-Effect Transistor) are used as switching elements, the second switching element Q2 is, for example, a p-channel MOS-FET and is connected as follows: The gate G2 is connected to ground 19, the source S2 to the switching line 22 and the drain D2 to the gate G1 of the first MOS-FET Q1. The first switching element Q1 is, for example, an n-channel MOS-FET and further connected as follows: The drain D1 is connected to ground 19 and the source S1 to the capacitor 13. Furthermore the circuit module 12 comprises the first resistor R1 connected between the drain D2 of the second MOS-FET (which is also connected to the ground G1 of the first MOS-FET) and the source S1 of the first MOS-FET (which is also connected to the capacitor 13).

In the first time period t1 (first state, active state), the circuit module 12 is in normal operating mode (communication state). No shutdown signal 31 is provided from the microcontroller 11 to the circuit module 12 via the shutdown line 21. A logically inverted shutdown signal is used as the driving signal 32 and provided to the switching module 15. In other words, while no shutdown signal 31 is present at or provided to the circuit module 12, the driving 32 is present at or provided to the switching module 15, in particular its second MOS-FET Q2. This results in the first MOS-FET Q1 being in conducting state, provided the driving signal 32 is greater than the pinch-off voltage of the second MOS-FET Q2. If this is the case, a current corresponding or related to the driving signal 32 flows via the first resistor R1 to ground 19, basically via the drain D1 of the first MOS-FET Q1. In this case, a parasitic diode Di1 of the first MOS-FET Q1, arranged in parallel between the source S1 and the drain D1, is negligible. The first gate voltage U1gs of the first MOS-FET Q1 (between the gate G1 and the source S1) is positive, provided the first gate voltage U1gs is greater than the pinch-off voltage of the first MOS-FET Q1. The second MOS-FET Q2 basically acts as a current source which provides to the first MOS-FET Q1 the current (and voltage) corresponding (or related) to the driving signal 32, as long as and/or as soon as the second MOS-FET Q2 is turned on or in conducting state, respectively. As long as the first MOS-FET Q1 is in conducting state, the capacitor 13 charges via the switching module 15 and discharges via the circuit module 12. Discharging of the capacitor 13 takes place by a current Ic flowing via the resistor arrangement or load 14 of the circuit module 12 to ground 19.

In the second time period t2 (second state, passive state), the circuit module 12 is in power down mode, and the shutdown signal 31 is provided to the circuit module 12.

During the second time period t2, the driving signal 32 is smaller or below the pinch-off voltage of the second MOS-FET Q2. The source S1 of the first MOS-FET Q1 falls to a negative voltage and, because of the first resistor R1, the first gate voltage U1gs becomes about 0 V. This results in the first MOS-FET Q1 blocking uni-directionally and the capacitor 13 does not—or even can not—discharge through the circuit module 12, in particular its resistor arrangement 14, by the current Ic. During the second time period t2, the second MOS-FET Q2 basically acts as a current source which does not provide a current to the first MOS-FET Q1 as long as the second MOS-FET Q2 is turned off or in non-conducting state, respectively. When changing the state, in particular at the beginning of the second time period t2, the voltage over the capacitor 13 may be much bigger than the voltage of the shutdown signal 31 or of the driving signal 32, without having an influence on the first MOS-FET Q1, in particular without putting the first MOS-FET Q1 in the conducting state. For example, the voltage over the capacitor 13 may be up to 50 V, while the voltage of the shutdown signal 31 or of the driving signal 32 provided to the switching module 15 is 5 V.

The microcontroller 11 is used to implement or effects the changing of the circuit module 12 from the active state (first time period t1) to the passive state (second time period t2), or vice versa. Accordingly, the microcontroller 11, at least indirectly, also effects (controls, supervises) the switching performed by the switching module 15.

FIG. 4a shows a time diagram of the voltage U over the capacitor 13 for the prior art reader 100 and the reader 1 according to the invention. During the first time period t1 (active state), which basically corresponds to the communication phase or the communication state, the reader 1—as well as the prior art reader 100—transceives the electro-magnetic field 3 for wireless communication 4 with the medium 2 (if the medium 2 is within the communication area or communication range of the reader 1) or transmits the electro-magnetic field 3 to check whether the medium 2 is present. In communication state, a nominal voltage Uop is applied to (present over) the capacitor 13. In the second time period t2 (passive state) the circuit module 12, or at least some active part(s) of the circuit module 12, is (are) put or switched into the suspended state (suspended phase, power down mode). The circuit module 12 is at least temporarily disabled or functionally disabled. Accordingly, no electro-magnetic field 3 is emitted by the reader 1—as well as the prior art reader 100—and no wireless communication 4 with the medium 2 takes place. The second time period t2 (passive state) follows the first time period t1, basically after the wireless communication 4 has been terminated or if no medium 2 is present (within the communication area). At the end of second time period t2, when leaving or terminating the power down mode, a subsequent communication phase follows in time period t3. The reader 1 transmits anew the electro-magnetic field 3 to check for presence of the medium 2 or, if the medium 2 is present within the communication distance of the reader 1, to communicate with the medium 2. In general, the microcontroller 11 of the reader 1 controls, implements and/or performs the communication 4 and therefore controls the circuit module 12 in this regard. Basically, the microcontroller 11 sets or defines the time periods t1, t2 used by the circuit module 12, or the active and passive states respectively. The length of the second time period t2 is, for example, defined by or in an application effected or executed via the microcontroller 11 and provided to the circuit module 12. The second time period t2 may vary, for example, between 10 ms and 10 s. The maximum length of the time period t2 is defined by the self-discharging behavior of the capacitor 13 in the suspended state (suspended phase). Typically the second time period t2 is about 200 ms.

In the second time period t2 (in power down mode), the voltage Uc over the capacitor 13 decreases much slower—if at all, except for self-discharging—, in the reader 1 according to the invention than in the prior art reader 100. FIG. 4a shows the voltage Uc(1) over the capacitor 13 of the reader 1 compared to the voltage Uc(100) of the prior art reader 100. As can be seen, there is no need to charge the capacitor 13 of the reader 1 to the nominal voltage Uop at the end of time period t2. This is particularly advantageous for battery powered readers. In case the capacitor 13 slightly discharges in the time period t2, it is possible to re-charge the capacitor 13 to the nominal voltage Uop at the end of said time period. Compared to the prior art, charging of the capacitor 13 of the reader 1 is achieved much faster and requires less energy or power.

FIG. 4b shows the voltage Uc+(1) of a first conductor of the capacitor 13 (connected to the circuit module 12) and the voltage Uc−(1) of a respective second conductor (connected to the switching module 15). As can be seen, in the first time period t1 (active state), in which the circuit module 12 is in non-suspended state and communication 4 with the medium 2 takes place, the first conductor has the positive voltage Uop and the second conductor is on ground. When changing from the first t1 to the second time period t2 (from active to passive state), in which the circuit module 12 changes from the non-suspended state into the suspended state (power down mode), the voltage of the first conductor Uc+(1) is pulled to 0 and the voltage of the second conductor Uc−(1) is pulled to a negative voltage −Uop, both almost immediately. The voltage difference between the first and the second conductor of the capacitor 13, basically the voltage Uc(1) over the capacitor 13 as shown in FIG. 4a, which more or less corresponds to the nominal voltage Uop, remains more or less constant. This is the case because the switching module 15 prevents that the capacitor 13, and thus the electronic circuit, discharges to ground 19 via the circuit module 12, or via the first or second switching element Q1, Q2, as shown above.

REFERENCE NUMERALS 1, 100 read/write device, reader
2 medium, data carrier
3 electro-magnetic field
4 non-contact communication, wireless communication
11 microcontroller
12 circuit module
13 capacitor
14 load (resistor arrangement)
15 switching module
19 ground
21 shutdown line
22 switching line
31 shutdown signal
32 driving signal
121 voltage output terminal (pin)
122 switch terminal (pin)
Di1 parasitic diode
D1, D2 drain
G1, G2 gate
Q1, Q2 switching elements, MOS-FETs
R voltage regulator (controller)
R1 first resistor
S power supply
S' optional external power supply
S1, S2 source

What is claimed is:

1. An electronic circuit comprising:
   a circuit module;
   a capacitor connected to the circuit module;
   a shutdown line providing a shutdown signal to the circuit module for suspending the circuit module; and a switching module;
   wherein the circuit module comprises a voltage regulator; the capacitor has one of its conductors connected to an output of the voltage regulator, forming a bi-directional, diode-free electrical connection between the capacitor and the voltage regulator, and the capacitor has the other one of its conductors connected to the switching module and the switching module is configured to disconnect the capacitor from ground depending on the shutdown signal such as to reduce discharging of the capacitor in a suspended state of the circuit module.

2. The electronic circuit according to claim 1, wherein the circuit module is an integrated circuit comprising a voltage regulator.

3. The electronic circuit according to claim 1, wherein the circuit module is an integrated circuit, and the switching module is integrated in the integrated circuit.

4. The electronic circuit according to claim 1, wherein the circuit module is an integrated circuit comprising a voltage regulator, the integrated circuit has a voltage output terminal providing an output voltage of the voltage regulator, the switching module is integrated in the integrated circuit, the integrated circuit has a switch terminal connected to the switching module, the capacitor has one of its conductors connected to the voltage output terminal, and the capacitor has the other one of its conductors connected to the switch terminal.

5. The electronic circuit according to claim 1, wherein the switching module comprises a first and a second switching element arranged in series, and a first resistor arranged in parallel to the first switching element and, together with the first switching element, connected to the capacitor.

6. The electronic circuit according to claim 5, wherein the first and the second switching element is a MOS-FET.

7. The electronic circuit according to claim 1, further comprising a microcontroller configured to provide the shutdown signal.

8. The electronic circuit according to claim 1, wherein the electronic circuit is configured as an electronic transceiver of a read/write device for wireless communication via an electro-magnetic field with a medium, and the circuit module is configured to perform communication in a non-suspended state.

9. The electronic circuit according to claim 8, wherein a frequency of the electro-magnetic field is between 100 kHz and 135 kHz, or a frequency of the industrial, scientific or medical band (ISM frequency), preferably 13.56 MHz.

\* \* \* \* \*